United States Patent [19]
Brandewie et al.

[11] 4,042,822
[45] Aug. 16, 1977

[54] LASER RADAR DEVICE UTILIZING HETERODYNE DETECTION

[75] Inventors: Richard A. Brandewie, Laguna Beach; Walter C. Davis, Tustin; John A. Macken, Santa Rosa, all of Calif.

[73] Assignee: Rockwell International Corporation, El Segundo, Calif.

[21] Appl. No.: 598,957

[22] Filed: July 24, 1975

[51] Int. Cl.² ........................... H01J 3/14; G01C 3/08; G01C 3/36
[52] U.S. Cl. ............................... 250/216; 250/203 R; 350/172; 356/5; 356/28
[58] Field of Search .................... 356/5, 28, 109, 112, 356/111; 350/172; 250/216, 203 R, 518

[56] References Cited
U.S. PATENT DOCUMENTS

| | | | |
|---|---|---|---|
| 3,173,019 | 3/1965 | Wormser | 250/203 X |
| 3,409,369 | 11/1968 | Bickel | 356/28 |
| 3,542,472 | 11/1970 | Vaniz | 356/4 |
| 3,644,043 | 2/1972 | Jones et al. | 356/5 |
| 3,836,256 | 9/1974 | Peters | 356/109 |
| 3,900,260 | 8/1975 | Wendt | 356/5 |

Primary Examiner—S. C. Buczinski
Attorney, Agent, or Firm—H. Fredrick Hamann; Rolf M. Pitts; Edward A. Sokolski

[57] ABSTRACT

A laser beam is expanded by means of a beam expander device, the expanded beam striking the surface of a mirror which has an aperture formed therein. A portion of the beam passes through the aperture and is focused so that it strikes an optical detector. The major portion of the beam is reflected from the mirror surface to a scanner mirror which provides a transmitter beam to scan targets to be detected. A beam received back from the targets also strikes the scanner mirror and is reflected by this scanner mirror to a corner reflector, the beam being displaced a predetermined amount by the corner reflector and reflected therefrom in a direction precisely opposite to that of the beam incident on the corner reflector. This beam, after being reflected by the corner reflector, strikes a reflective surface of the apertured mirror directly opposite to that on which the laser beam is incident. The received beam is reflected by the mirror in precise alignment with the laser beam passing through the mirror aperture such that the wave fronts of the two beams are parallel, the second beam being focused so that substantially all of its energy strikes the optical detector. The received energy is thus mixed with the laser beam energy passed through the aperture to provide heterodyne detection of the received target signals.

10 Claims, 6 Drawing Figures

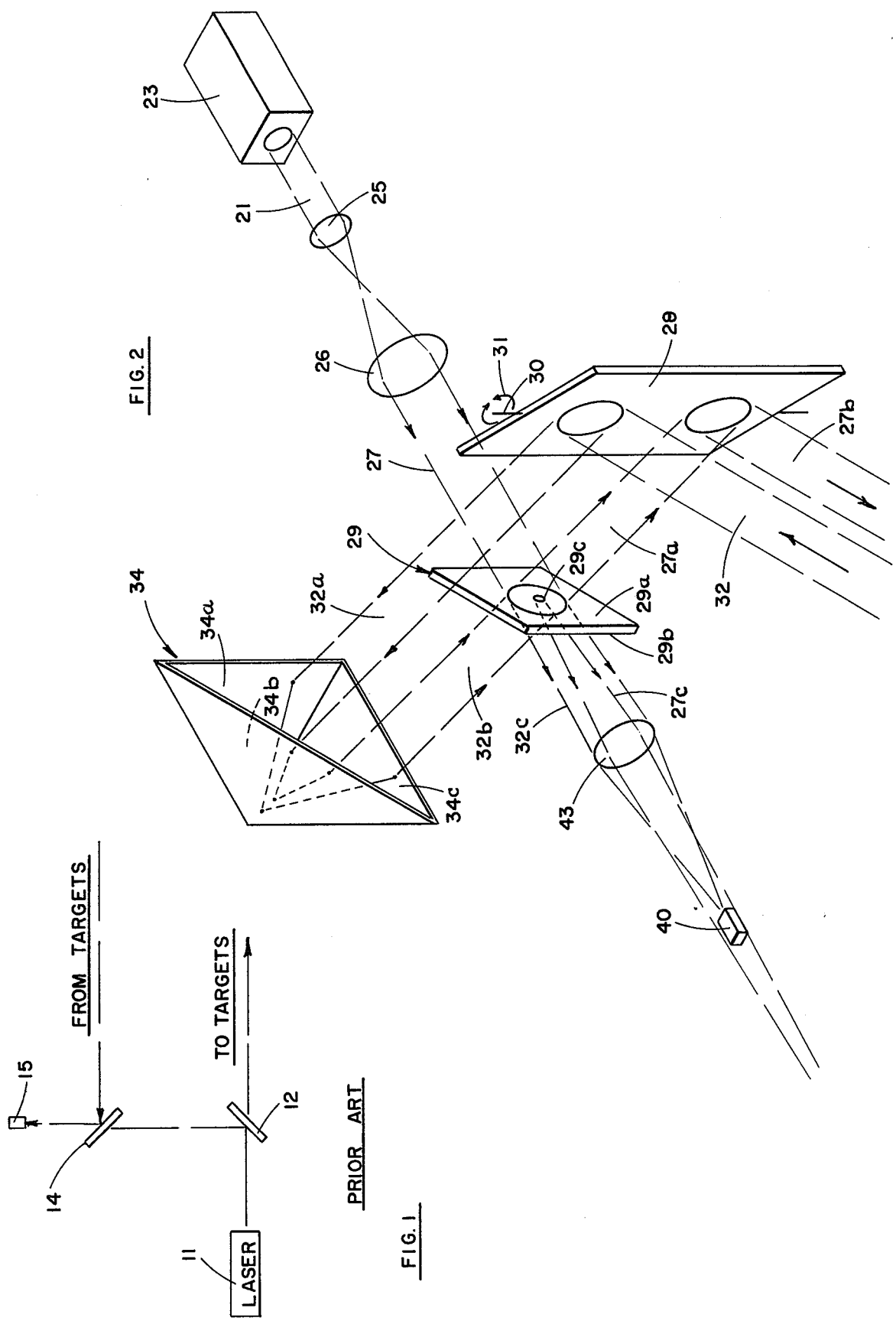

LASER RADAR DEVICE UTILIZING HETERODYNE DETECTION

BACKGROUND OF THE INVENTION

This invention relates to a device utilizing a laser beam for target detection, and more particularly to such device employing heterodyne detection of the target echoes.

In laser radar devices heterodyne detection has been found to be useful in increasing the signal to noise ratio of the system in view of the gain involved in the mixing process. A typical prior art implementation of a laser system utilizing heterodyne detection is shown in FIG. 1. In this implementation, a beam from laser 11 is passed through beam splitter 12 to targets, echoes from the targets being reflected from a surface of beam splitter 14 onto detector 15. A portion of the laser energy is also reflected from the surface of beam splitter 12 and passes through beam splitter 14 to the target. The two beam splitters are aligned such that the wave fronts of the beam from the targets, reflected off the top surface of beam splitter 14, and the beam from the laser which passes through beam splitter 14 are parallel. It can be shown under such conditions, the electrical signal, $S_h$, obtained from the detector is as follows:

$$S_h = R\sqrt{P_{LO}P_s} \tag{1}$$

where
R = detector responsivity
$P_{LO}$ = local oscillator power
$P_s$ = signal power.

Thus it can be seen that a substantial improvement in power output is achieved over the detection process referred to as incoherent detection where no mixing of the target signal is utilized, in which case the detector power is equal to $RP_s$. Heterodyne detection systems of the prior art such as that of FIG. 1, however, require precise alignment of the optical components for proper operation for, as already noted, the two beam splitters of FIG. 1 must be aligned such that the wave fronts of the two beams striking the detector are parallel to within a small fraction of the diffraction angle of the receiver or transmitter optics. Such alignment is difficult to maintain, particularly where the system is carried on a vehicle subject to jarring, shock and vibration, as is generally the case in military applications. Further, the use of beam splitters presents losses of light energy which undesirably lowers the efficiency of the system.

The present invention overcomes the aforementioned shortcomings of the prior art in providing a system which is relatively insensitive to alignment errors such as might be occasioned by jarring or vibration of system components. Further, the system of the invention utilizes reflective elements throughout so as to avoid the inherent inefficiencies of partially transmissive elements such as beam splitters.

It is therefore an object of this invention to lessen the requirement for precise alignment of elements in a radar laser heterodyne detection system.

It is a further object of this invention to facilitate the operation of a laser radar system using heterodyne detection in a vehicle which is subject to vibration and shock.

It is still another object of this invention to increase the efficiency of operation of a laser radar using heterodyne detection.

Other objects of the invention will become apparent as the description proceeds in connection with the accompanying drawings.

DESCRIPTION OF THE DRAWINGS

FIG. 1 is a schematic drawing illustrating the prior art;

FIG. 2 is a schematic drawing illustrating a preferred embodiment of the invention;

SUMMARY OF THE INVENTION

Figure 4:
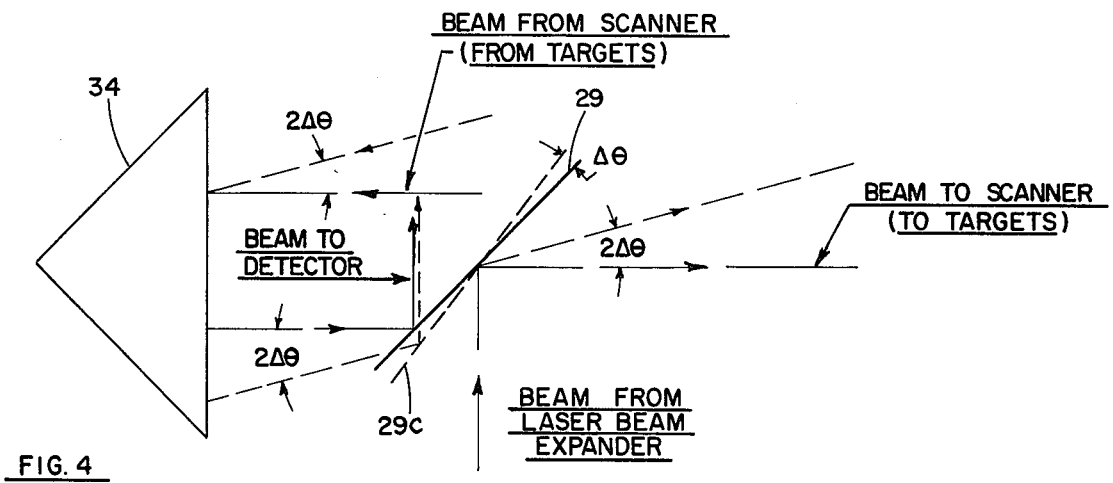
FIG. 4 is a schematic drawing illustrating the insensitivity to misalignment of the "mixing" mirror in the preferred embodiment.

A light beam from a laser is expanded in width, this expanded beam being directed against a reflective surface of a "mixing" mirror. The mixing mirror has a small aperture in the portion thereof against which the expanded laser beam is incident. A portion of the laser beam energy is passed through the aperture in the mirror and is focused by means of a lens so that it strikes a photodetector. Another portion of the expanded radar beam is reflected by the mixing mirror to a scanner mirror from which it is directed towards a target to be detected. A reflected beam from the target strikes the scanner mirror at a position thereon displaced from the transmitted beam. The received beam is reflected from the scanner mirror to an off-center portion of a corner reflector. This beam strikes the corner reflector at such an angle so that it successively is reflected from each of the mutually orthogonal surfaces of this reflector to provide a reflected beam precisely parallel to the incident beam. The beam reflected from the corner reflector is displaced from the incident beam to a position such that it strikes a reflective surface of the mixing mirror opposite to the surface on which the expanded laser beam is incident and at a position on this surface directly opposite to that from which the laser beam is reflected to the scanner. The beam from the corner reflector is reflected from the mixing mirror through the lens which focuses it onto the detector where it is mixed with the light energy coupled through the mirror aperture.

In the second embodiment of the invention, the mixing mirror has a pair of spaced apertures and the portion of the laser beam used for mixing with the received beam is passed through one of the apertures and reflected back through the other aperture by the corner reflector. In this embodiment, the transmitted and received beams are both reflected from one surface of the mixing mirror, the received beam being reflected from a portion of the mirror encompassing the last mentioned aperture.

It is to be noted that the target is generally a diffuse reflector which provides a divergent reflection. The return signal, however, appears collimated because it emanates from the far field. The invention could also be implemented with targets in the near field by means, for example, such as a lens large enough to encompass both transmitted and received beams placed between the mixing mirror and scanner.

DESCRIPTION OF A PREFERRED EMBODIMENT

Referring now to FIG. 2, a preferred embodiment of the invention is schematically illustrated. Beam 21 which is emitted by laser 23 is expanded by means of the lens system comprising lenses 25 and 26 to form expanded beam 27. The major portion of beam 27 is reflected from side 29a of mixing mirror 29. Mixing mirror 29 is a two-sided plane parallel mirror having highly reflective surfaces on the opposite sides 29a and 29b thereof. All but a small portion of the beam energy is reflected off surface 29a, this reflected beam 27a being incident on scanner mirror 28 from which it is reflected (beam 27b) towards potential targets. Scanner mirror 28 is reciprocally driven about axis 30 as indicated by arrows 31, in a manner conventional in prior art laser radar systems. The transmitted beam 27b is scanned over the target area, beam 32 representing reflections from the targets. It is to be noted that reflected beam 32 is shifted in frequency from beam 27, such frequency shift being occasioned by both the scanning process and doppler shift due to target movement. This frequency shift is significant in that it enables a heterodyning action between the target signals and the portion of beam 27 coupled to detector 40, as to be described further on in the specification.

Reflected beam 32 is parallel to transmitted beam 27b, and is displaced therefrom such that it is incident upon scanner mirror 28 at a different position thereon than beam 27a. Beam 32 is reflected from scanner mirror 28 as beam 32a, beam 32a being directed to corner reflector 34. Corner reflector 34 is formed from three mutually orthogonal reflecting surfaces 34a–34c. Beam 32a is incident on one of the reflecting surfaces at an angle such that the beam successively strikes the other two reflective surfaces. As is well known in the art, this will result in a reflected beam 32b from the corner reflector which is precisely 180° shifted in direction from incident beam 32a. Beam 32a is directed so that it strikes the corner reflector at an off-center position such that beam 32b is translated therefrom, the elements being dimensioned, and positioned so that beam 32b is incident on reflective surface 29b of mixing mirror 29 at a position thereon directly opposite the location of the spot of beam 27 on surface 29a.

Beam 32b is reflected off surface 29b as beam 32c. Beam 32c passes through lens 43 which has a diameter equal to that of the beam, this lens focusing beam 32 onto photodetector 40.

Mixing mirror 29 has a small aperture 29c formed therein through which a small portion of the energy of beam 27 is coupled. This laser energy diverges from aperture 29c as indicated by arrows 27c, and is focused so that it strikes detector 40 for mixing with beam 32c. As already noted, the wave fronts of beams 27c and 32c must be substantially parallel at their point of incidence on the detector. The two beams are mixed in detector 40 by virtue of the heterodyning action therebetween, to provide a target signal for use in the radar system.

Figure 3:
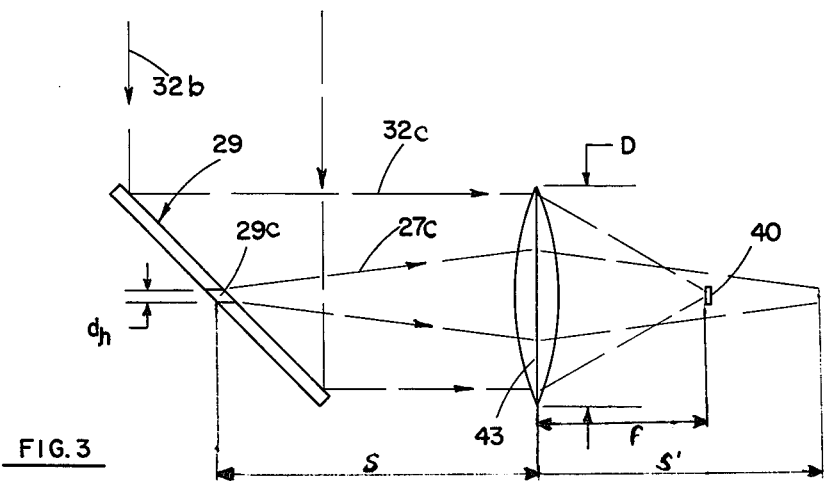
FIG. 3 is a schematic drawing illustrating the operation of the detection system of the preferred embodiment.

Referring now to FIG. 3, the operation of the detection system of the preferred embodiment is schematically illustrated. As can be seen, beam 32b which represents the target signals is reflected from the surface of mirror 29 as beam 32c. Beam 32c is focused by means of lens 43 onto detector 40 which lies in the focal plane of the lens. The diameter, D, of lens 43 is preferably at least equal to that of beam 32c. Detector 40 preferably has a diameter matched to the Airy disc diameter of lens 43 when illuminated with a plane wave, which can be shown to be equal to $2.44\,(\lambda/D)f$, $f$ being the focal length of lens 43. It can be shown that the effective "local oscillator" power ($P_{LO}$) i.e., the power from beam 27c which strikes detector 40 is as follows (utilizing the above indicated parameters):

$$P_{LO} = \frac{\pi(2.44)^2}{4}\left(\frac{d_h}{D}\right)^4 P_t \tag{2}$$

where
$P_t$ is the power of laser beam 27 and $d_h$ is the diameter of aperture 29c.

Equation (2) may be used to estimate the diameter of aperture 29c. Assuming for example that the local oscillator power requirement ($P_{LO}$) is $10^{-3}$W, D = 5cm, and $P_t$ = 20 W, equation (2) then gives $d_h$ = 2.79mm. In actual practice it has been found that the best size for aperture 29c needs to be determined experimentally for any given detector. It is to be noted that it is necessary to locate the detector accurately at the focal point of the lens and in line with the coupling hole and center line of the laser beam in order to avoid aberrations in the lens.

Alignment of the received "local oscillator" waves in the focal plane is significantly easier using the aperture coupling technique of the present invention than in optical heterodyning techniques of the prior art. This is in view of the fact that the aperture coupling technique of the present invention produces a spherical wave which is focused by the lens a distance, $s'$, from the lens (see FIG. 3). The local oscillator wave may then be represented by a spherical wave centered on s with a radius of curvature equal to $s'$. The signal wave 32c is assumed to be plane in the focal plane of lens 43. For a detector diameter, $d$, equal to $2.44\ f/D$, the sagittal depth, $\Delta$, is as follows:

$$\Delta = \frac{d^2}{8s'} = \frac{(2.44)^2 \lambda^2 f^2}{8D^2 s'} \tag{3}$$

If we impose the requirement that $\Delta \leq \lambda/10$, $$\Delta = \frac{(2.44)^2 \lambda^2 f^2}{8D^2 s'} \leq \frac{\lambda}{10} \tag{4}$$

$$s' \geq \frac{10(2.44)^2}{8}\left(\frac{f}{D}\right)^2 \lambda \tag{5}$$

$$s' \geq 7.44 \left(\frac{f}{D}\right)^2 \lambda \tag{6}$$

Substituting the following typical values for the parameters of equation (6) as follows: $f$ = 50 cm, D = 5 cm, and $\mu = 10^{-3}$cm, we arrive at a value of $s' \geq 0.744$ cm. This design parameter can readily be met since, by the lens equation, $s' = sf/s-f$. Thus, for example, if $s = 2f$, then $s' = 2f = 100$ cm, meeting the requirement of $s'$ with two orders of magnitude to spare.

Referring now to FIG. 4, the insensitivity of the device of the invention to errors in the alignment of mixing mirror 29, or rapid changes in the mirror position as might be occasioned by vibration of the vehicle on which the device is mounted, is illustrated. Let us assume that the mixing mirror is moved through a small angle, $\Delta\theta$, to the dotted line position as shown in the Figure. The transmitted beam (beam to scanner) as shown in the Figure will then move through an angle $2\Delta\theta$. The target return (beam from scanner) (dotted line) as shown in the Figure will be parallel to the transmitted beam and will be reflected by corner reflector 34 parallel to the beam incident on the reflector. Since the mixing mirror has been moved through an angle $\Delta\theta$, the beam reflected from the mixing mirror to the detector will be precisely in alignment with the beam reflected from the mirror in its initial position. It thus should be apparent that variations in the angular orientation of mirror 29 will not cause misalignment of the beam reflected to the detector. It is also to be noted that since reflections from the corner reflector are always parallel to the incident beam, the angular orientation of corner reflector 34 does not adversely affect the alignment of the beam to the detector. Preferably, corner reflector 34 should be fabricated to an angular tolerance better than the diffraction limit of aperture 29c, and the surfaces of mixing mirror 29 are made parallel to this same tolerance. For a 5 cm mixing mirror aperture, at a wave length of 10.6 microns, this tolerance angle, $\lambda/D$, is 0.2 mrad. Even where requiring an accuracy of 0.1 ($\lambda/D$), which would give a tolerance angle of 0.02 mrad, fabrication of the corner reflector and the mirror presents no significant problem.

Figure 5:
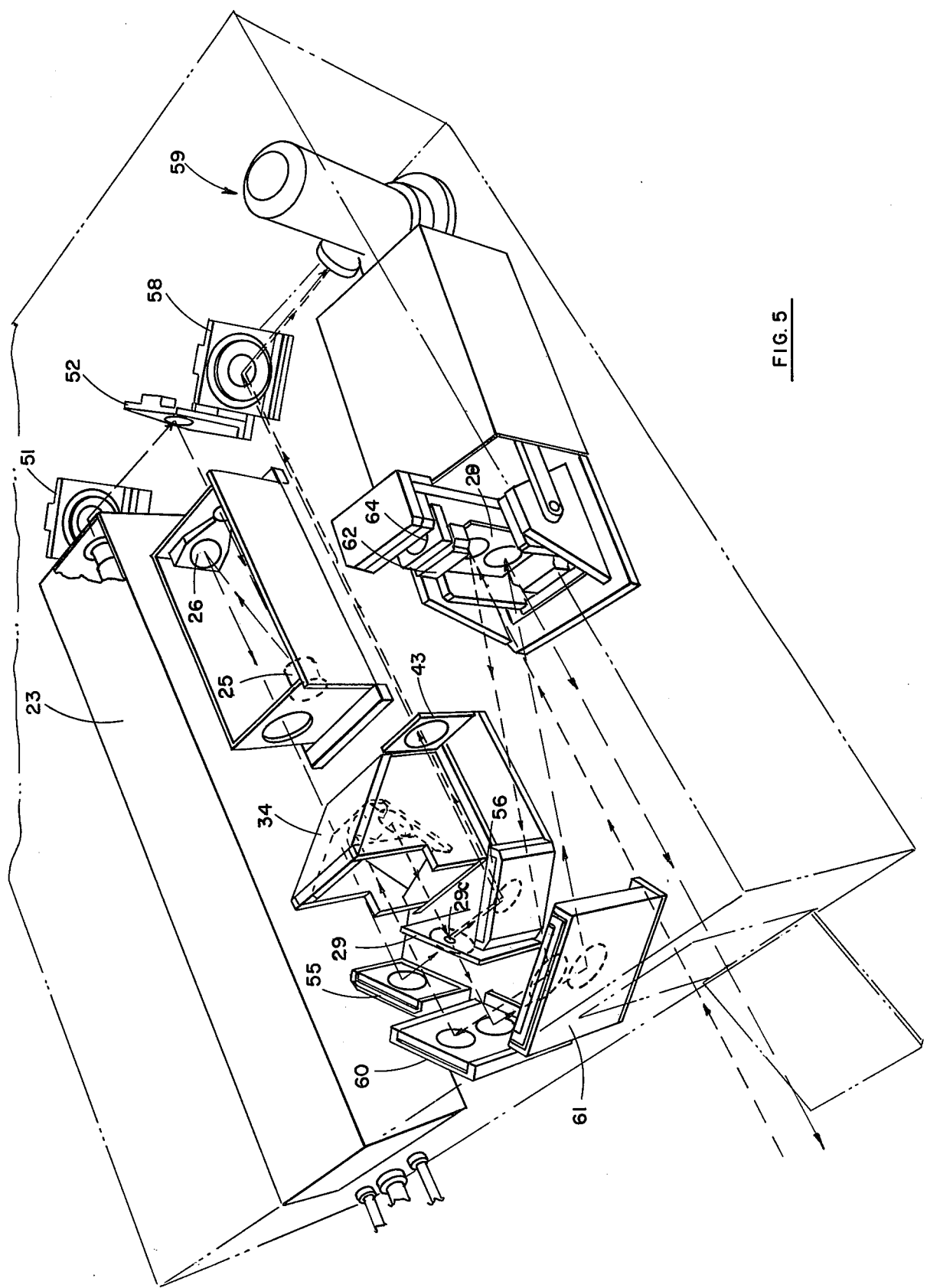
FIG 5 is a pictorial drawing illustrating a specific implementation of the preferred embodiment.

Referring now to FIG. 5, a specific implementation of the preferred embodiment is pictorially illustrated. The laser beam generated by laser 23 is successively reflected off mirrors 51 and 52, and from mirror 52 directed to a beam expander formed by mirrors 25 and 26. These two mirrors correspond functionally to lenses 25 and 26 respectively of FIG. 2. The mirrors are designed to expand the beam as may be necessary, the expanded beam being reflected from mirror 26 to mirror 55. From mirror 55, the beam is directed to mixing mirror 29, a portion of the beam energy being diffracted through aperture 29c formed in the mirror. The beam diffracted through aperture 29c is reflected from mirror 56 through lens 43 which operates to focus the beam as described in connection with FIG. 3. This beam is then reflected off mirror 58 towards the detector (not shown) which is mounted in housing 59.

The major portion of the light energy reflected by mirror 55 which is incident on mixing mirror 29 is reflected from mirror 29 from where it is successively incident on mirrors 60 and 61 and scanning mirror 28, from which it is directed towards targets to be detected. Scanning mirror 28 is pivotally mounted in support member 62 and is reciprocally driven by a drive mechanism 64 in a predetermined scanning pattern.

A reflected beam from the targets is incident upon the scanning mirror, this last mentioned beam being parallel to the transmitted beam but spaced therefrom. The target beam reflected from scanning mirror 28 is successively incident on mirrors 61 and 60, and is reflected from mirror 60 onto corner reflector 34. The target beam reflected from the corner reflector is successively incident upon mixing mirror 29 and mirror 56, from where it passes through lens 43 which operates to focus the beam on the detector. After it has passed through lens 43, the beam is reflected by mirror 58 onto the detector (not shown), which is housed in housing 59. The implementation of FIG. 5 operates in the same basic manner as described in connection with FIGS. 2-4, the optics being functionally the same as that shown in FIG. 2, the various additional mirrors being utilized to facilitate the packaging of the device.

DESCRIPTION OF A SECOND EMBODIMENT

Figure 6:
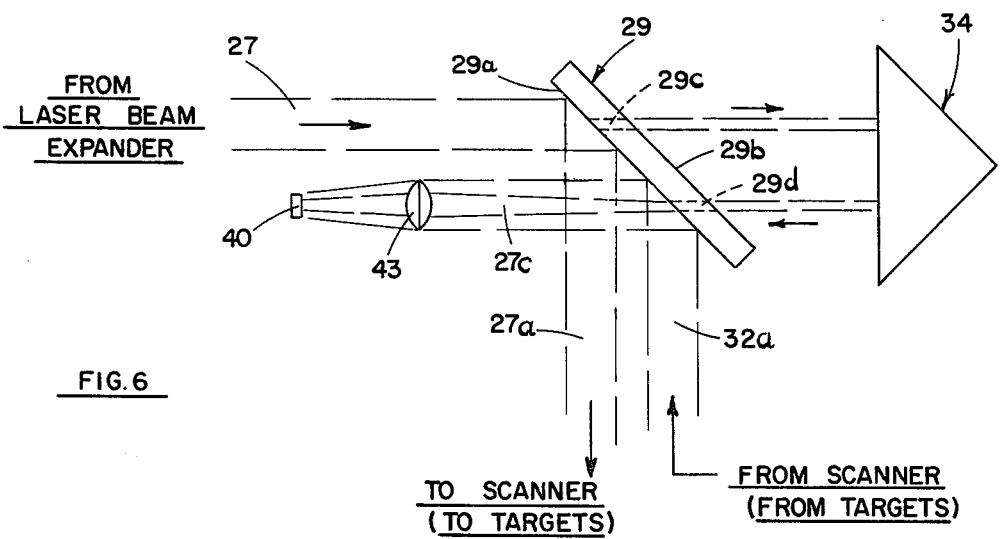
FIG. 6 is a schematic drawing of a second embodiment of the invention.

Referring now to FIG. 6, a second embodiment of the invention is schematically illustrated. In this second embodiment, mixing mirror 29 has only a single reflective surface 29a, surface 29b being non-reflective. Further, corner reflector 34 can be substantially smaller in size than for the previous embodiment in that it need not handle the beam received from the target. Beam 27 from the laser beam expander is reflected from surface 29a of the mirror to provide beam 27a to the scanner. The beam received at the scanner and reflected therefrom (beam 32a) is reflected from surface 29a and focused by means of lens 43 onto detector 40. A small portion of beam 27 is coupled through aperture 29c in the mirror and is incident upon corner reflector 34. This beam is reflected by the corner reflector and passes through a second aperture 29d formed in mirror 29. Beam 27c which is coupled through aperture 29d is focused by lens 43 so that it strikes detector 40 and is mixed with the received beam as for the previous embodiment. As already noted, this embodiment permits the utilization of a much smaller corner reflector than the previous embodiment. However, in this second embodiment, alignment is somewhat more critical such that translational errors in the "local oscillator" beam, which must pass through both apertures 29d and 29c and is reflected from corner reflector 34, can cause a loss of power in this beam.

While the invention has been described and illustrated in detail, it is to be clearly understood that this is intended by way of illustration and example only and is not to be taken by way of limitation, the spirit and scope of the invention being limited only by the terms of the following claims.

We claim:

1. A heterodyning light beam radar device comprising means for emitting a light beam, mixing mirror means having aperture means formed therein, said light beam being directed towards said mixing mirror means, a portion of the light energy of said beam being reflected by said mixing mirror means and a portion of said energy passing through said aperture means, scanner mirror means receiving the light energy reflected by said mixing mirror means for providing a light beam from said light energy for scanning targets to be detected, target reflections of said light energy being received by said scanner mirror means, the target reflections being reflected from the scanner mirror means and onto a portion of said mixing mirror means encompassing the aperture means, detector means for detecting the target reflections, and means for focusing the portion of the light energy passing through the aperture means and the target reflections from the scanner mirror means onto said detector means where the light energy is detected with heterodyning action.

2. The device of claim 1 wherein said aperture means comprises a single aperture, said mixing mirror means having a pair of opposite reflective surfaces, the beam from said emitting means being reflected off one of said surfaces to said scanner mirror means and further including a corner reflector, the target reflections being reflected from the scanner mirror means to the corner reflector and from the corner reflector to a portion of the other reflective surface of said mixing mirror means which encompasses said aperture.

3. The device of claim 1 wherein the aperture means comprises a pair of spaced apertures and further including a corner reflector, only one surface of said mixing mirror means being reflective, the beam from said emitting means being directed towards the reflective surface of said mixing mirror means with a portion thereof being reflected thereby and a portion thereof passing through one of said apertures, the corner reflector being positioned to receive the light energy passed through said one aperture and reflecting said light energy through the other of said apertures for focusing by said focusing means on said detector means, along with target reflections.

4. The device of claim 1 and further including means for expanding the emitted light beam, the expanded beam being directed towards said mixing mirror means.

5. The device of claim 4 wherein the focusing means comprises a lens having a diameter substantially equal to that of the expanded beam.

6. The device of claim 4 wherein said expanding means comprises a pair of mirrors, one of said mirrors having a greater diameter than the other of said mirrors.

7. A heterodyning laser radar device comprising:
means for generating a laser beam,
means for expanding said beam to a predetermined diameter,
a mixing mirror having opposite plane reflective surfaces and an aperture therein, the expanded beam being incident on a portion of one of the mirror surfaces encompassing said aperture,
a scanner mirror, the major portion of the expanded beam being reflected from said one of said mixing mirror surfaces to said scanner mirror,
means for driving said scanner mirror to cause the expanded beam to be reflected from said scanner mirror towards a target area, reflections from said target area striking said scanner mirror and being reflected thereby,
reflector means for reflecting the target area reflections from said scanner mirror onto a portion of the other surface of said mixing mirror, said mixing mirror aperture being at the center of the last mentioned mirror portion, a beam being reflected from said other mixing mirror surface,
detector means for detecting said target area reflections, and
means for focusing the beam reflected from said other mixing mirror surface onto said detector means, a portion of the expanded beam passing through the mixing mirror aperture and being focused by said focusing means onto the detector for mixing with the target area reflections, said detector detecting the target area signals by heterodyne detection.

8. The device of claim 7 wherein said reflector means comprises a corner reflector, the target area reflections being reflected by said reflector parallel thereto and displaced therefrom.

9. The device of claim 7 wherein said focusing means comprises a lens having a diameter substantially equal to the diameter of the expanded beam.

10. The device of claim 9 wherein said lens focuses the portion of the beam passing through the mixing mirror aperture at a point beyond said detector.

* * * * *